(12) United States Patent
Dudar et al.

(10) Patent No.: US 10,071,732 B2
(45) Date of Patent: Sep. 11, 2018

(54) WINDSHIELD STONE IMPACT RESPONSE

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 64 days.

(21) Appl. No.: 15/407,537

(22) Filed: Jan. 17, 2017

(65) Prior Publication Data

US 2018/0201257 A1 Jul. 19, 2018

(51) Int. Cl.

| | |
|---|---|
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G06F 7/00* | (2006.01) |
| *G06F 17/00* | (2006.01) |
| *G06F 19/00* | (2018.01) |
| *A01B 69/00* | (2006.01) |

(Continued)

(52) U.S. Cl.
CPC ............ *B60W 30/08* (2013.01); *B60J 1/2094* (2013.01); *B60W 10/04* (2013.01); *B60W 10/184* (2013.01); *B60W 10/20* (2013.01); *B60W 10/30* (2013.01); *B60W 50/14* (2013.01); *G05D 1/0214* (2013.01); *B60W 2030/082* (2013.01); *B60W 2550/00* (2013.01); *B60W 2710/18* (2013.01); *B60W 2710/20* (2013.01); *B60W 2710/30* (2013.01); *B60W 2720/24* (2013.01); *G05D 2201/0213* (2013.01)

(58) Field of Classification Search
CPC .... B60W 30/08; B60W 10/04; B60W 10/184; B60W 10/20; B60W 10/30; B60W 50/14; B60W 2030/082; B60W 2550/00; B60W 2710/18; B60W 2710/20; B60W 2710/30; B60W 2720/24; G05D 1/0214; G05D 2201/0213
See application file for complete search history.

(56) References Cited

U.S. PATENT DOCUMENTS

| | | |
|---|---|---|
| 5,432,415 A | 7/1995 | Ittah et al. |
| 5,436,060 A | 7/1995 | Saurer et al. |

(Continued)

FOREIGN PATENT DOCUMENTS

| | | |
|---|---|---|
| CN | 105711585 A | 6/2016 |
| DE | 102013020435 A1 | 6/2014 |
| DE | 102015203026 A1 | 8/2016 |

OTHER PUBLICATIONS

GB Search Report dated Jul. 6, 2018 re GB Appl. No. 1800735.1.

*Primary Examiner* — Mussa A Shaawat
(74) *Attorney, Agent, or Firm* — Frank A. MacKenzie; Bejin Bieneman PLC (57) ABSTRACT

A vehicle includes a windshield having an integral pressure sensor. A signal from the pressure sensor is used to identify an impact against the windshield as a stone impact. Responsive to identifying the stone impact, identifying any large truck located within a predetermined radius of the vehicle. Responsive to identifying a large truck, the vehicle is directed to make an evasive maneuver to avoid stones dropped or thrown by the large truck.

20 Claims, 7 Drawing Sheets

(51) Int. Cl.
  *B60W 30/08* (2012.01)
  *B60W 10/20* (2006.01)
  *B60W 10/184* (2012.01)
  *B60W 10/04* (2006.01)
  *B60W 10/30* (2006.01)
  *B60W 50/14* (2012.01)
  *G05D 1/02* (2006.01)
  *B60J 1/20* (2006.01)

(56) References Cited

U.S. PATENT DOCUMENTS

| | | | |
|---|---|---|---|
| 7,475,587 B2 | 1/2009 | Kithil et al. | |
| 7,702,439 B2 | 4/2010 | Kithil | |
| 9,783,166 B1* | 10/2017 | Brown | B60S 1/481 |
| 2010/0163675 A1* | 7/2010 | Rashid | B32B 17/10009 |
| | | | 244/129.3 |
| 2010/0168935 A1* | 7/2010 | Rashid | B64C 1/1484 |
| | | | 701/3 |
| 2013/0145839 A1 | 6/2013 | Niemann et al. | |
| 2014/0285332 A1 | 9/2014 | Delong | |
| 2016/0253850 A1* | 9/2016 | Baumgaertel | G01N 29/14 |
| | | | 701/33.9 |
| 2016/0266070 A1 | 9/2016 | Baumgartel | |

* cited by examiner

WINDSHIELD STONE IMPACT RESPONSE

BACKGROUND

Vehicle windshields or windscreens provide a forward-facing, substantially transparent, viewing pane for allowing forward viewing by occupants and/or certain vehicle control sensors. Windshields also form part of the vehicle structure. Damage to a vehicle's windshield may produce a crack or cracks in the windshield that may compromise a structural integrity of the vehicle, a performance of an autonomous vehicle control system, and forward viewing by vehicle occupants.

DETAILED DESCRIPTION

Introduction

A vehicle includes a windshield having an integral pressure sensor. A signal from the pressure sensor is used to identify an impact against the windshield as a stone impact. Responsive to identifying the stone impact, a vehicle computer is programmed to identify any large truck located within a predetermined radius of the vehicle. Responsive to identifying a large truck, the vehicle is directed to make an evasive maneuver to avoid stones dropped or thrown by the large truck. The vehicle may be what is referred to as an autonomous vehicle, and may or may not carry human passengers.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a driver seat, facing a dashboard. In the Figures, like numerals indicate like parts throughout the several views.

Exemplary System Elements

Figure 1:
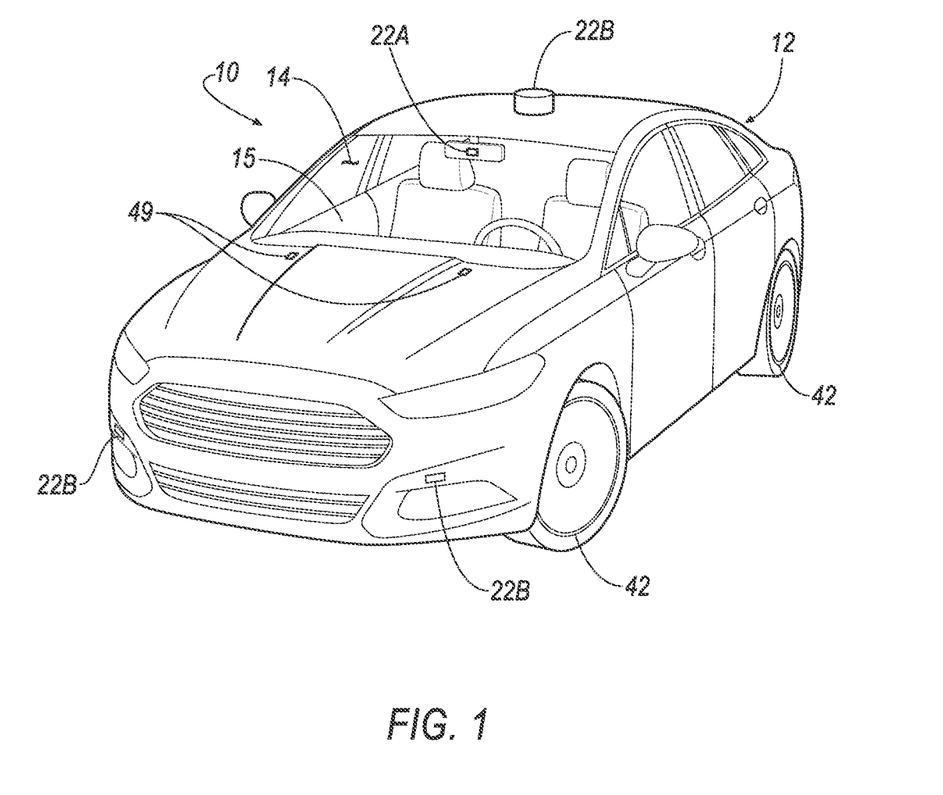
FIG. 1 is a perspective view of an example autonomous vehicle having a sensor module mounted thereon.
Figure 2:
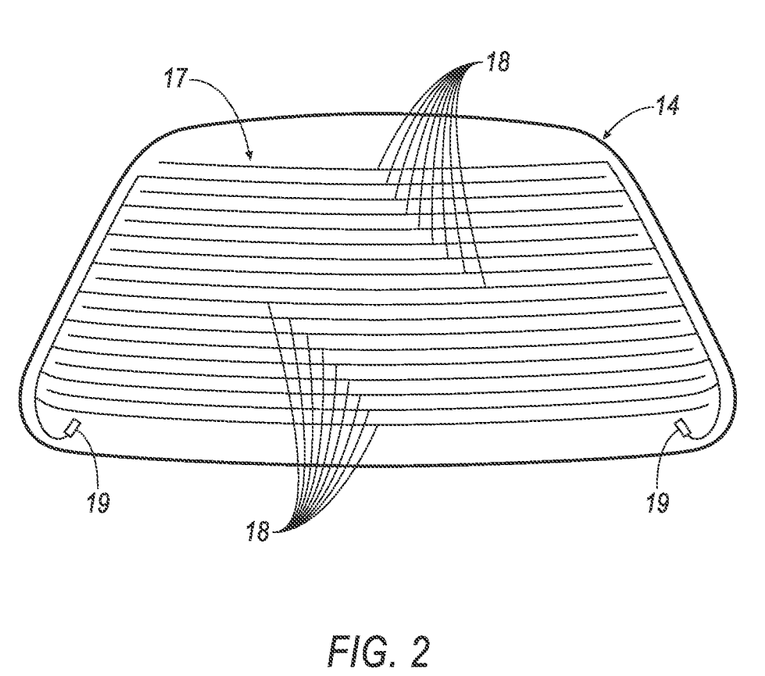
FIG. 2 is a front view of an example windshield of including exemplary piezoelectric sensors.
Figure 3:
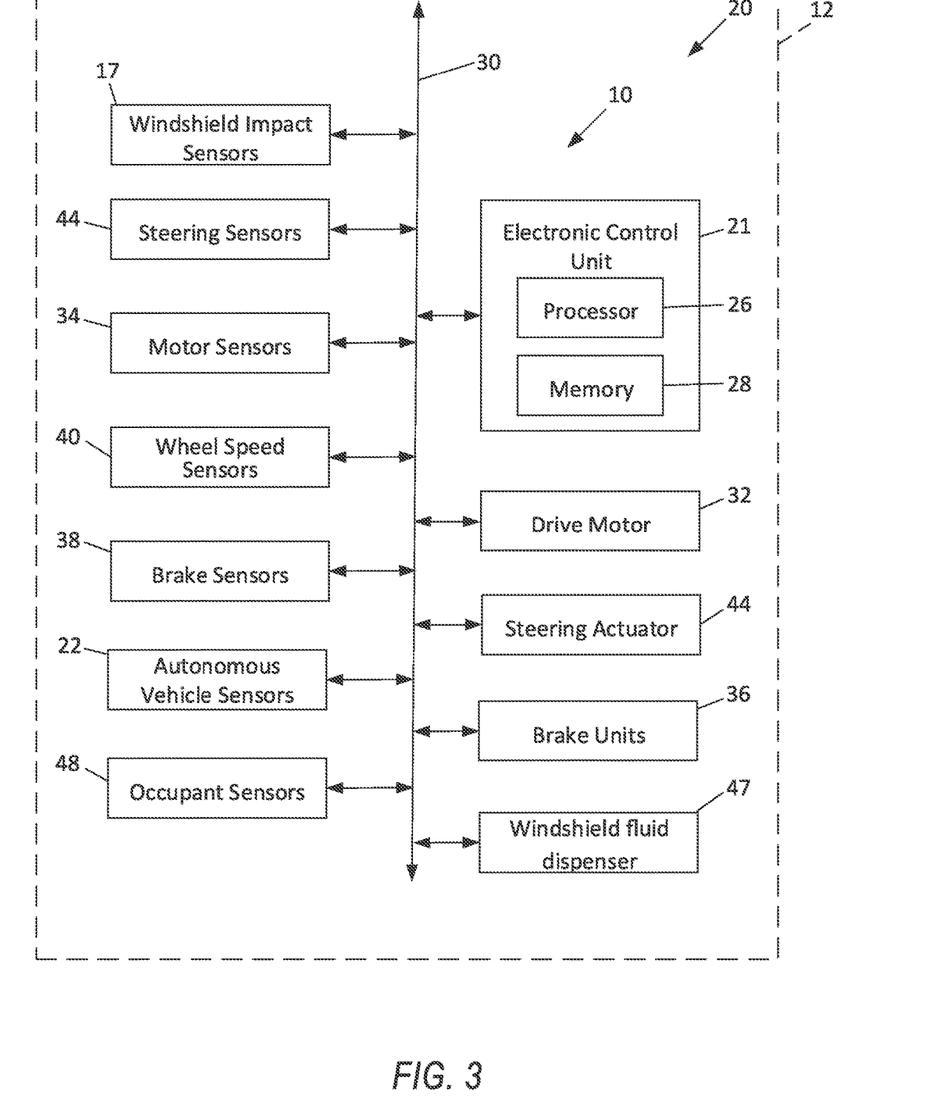
FIG. 3 is an example block diagram of the autonomous vehicle of FIG. 1 including sensors and a controller.
Figure 4A:
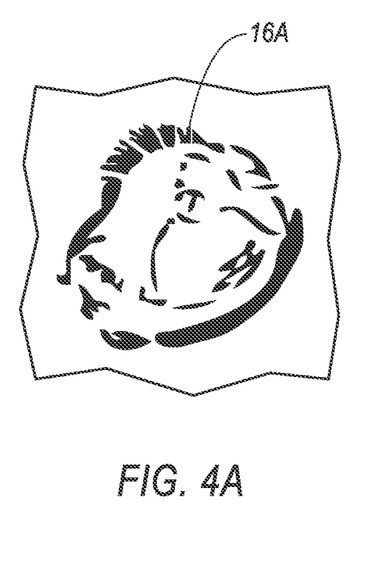
FIGS. 4A, 4B, 4C and 4D are illustrations of four example types of windshield damage from stone impacts.
Figure 4B:
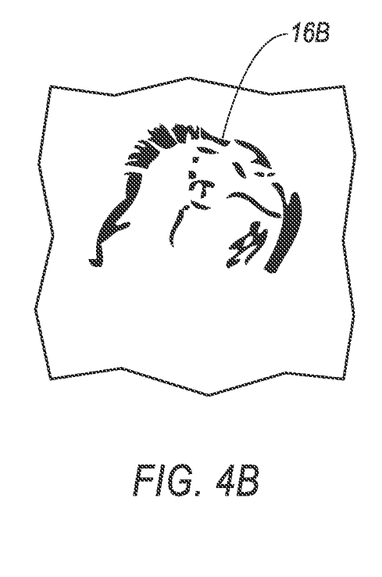
Figure 4C:
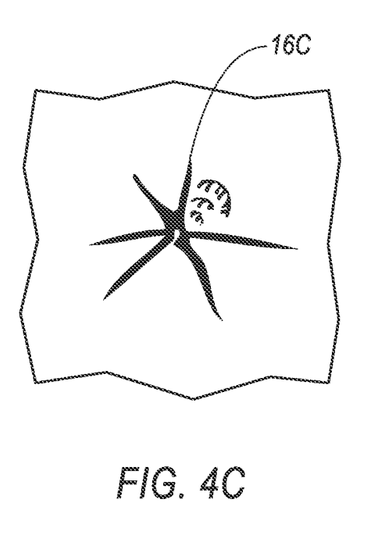
Figure 4D:
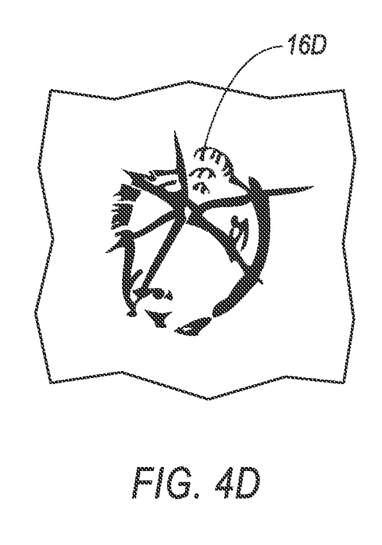

With reference to FIGS. 1 through 3, a windshield stone impact response system 10 for an exemplary vehicle 12 includes an example windshield 14 able to detect impacts including stone impacts. FIGS. 4A, 4B, 4C, and 4D illustrate four different types of windshield damage that may occur when a stone hits a vehicle windshield. Windshield 14 protects vehicle occupants seated in a passenger cabin 15 disposed behind the windshield from on-coming air and flying objects, including by way of example, road debris and insects. Windshield 14 also serves as a structural member resisting deformation of, and/or intrusion of objects into, the passenger cabin 15 in a crash event.

Prompt attention to windshield stone chips 16A, 16B, 16C and 16D (collectively 16) such as those illustrated in FIGS. 4A, 4B, 4C, and 4D respectively, may allow windshield 14 to remain in service in the vehicle 12. Failure to promptly attend to such damage may result in the chip becoming a crack in the glass that may compromise the structural integrity of the vehicle 12. Commercially available windshield repair services and products may be used to prevent stone chips 16 from becoming a crack. However, the time between the occurrence of a chip 16 and its transformation or propagation into a non-repairable crack requiring windshield replacement may be short. Variables affecting such transformation and propagation include the type of chip sustained and subsequent stresses and strains on the windshield 14. Stresses and strains on the windshield 14 may include including those due to temperature variations, and especially temperature increases, and those due to structural loading inputs, as might occur by vehicle 12 driving over rough roads.

Windshield 14, best seen in FIG. 2, includes an example integral windshield impact sensor 17 that encompasses substantially all of the windshield 14. Impact sensor 17 may be a pressure sensor, sensing pressure against the windshield 14. Sensor 17 may include a collection of one or more discrete sensors such as, by way of example, a plurality of thin film piezoelectric sensors 18. Windshield 14 may be a known laminate structure with sensor 17 sandwiched between window layers, with one layer being a glass panel. Sensors 18 may terminate in connectors 19 which may extend from the laminated structure. While a plurality of example non-transparent sensors 18 are illustrated, transparent film sensors are known and may alternatively be employed.

Vehicle 12 is an autonomous vehicle (as that term is defined below), having a pilot system 20 that may include a plurality of sensors and a plurality of actuators, connected to a computing device e.g., in the form of an electronic control unit ("ECU") 21. Pilot system 20 may include windshield stone impact response system 10 which may be mutually inclusive of components and computer instructions of the pilot system 20. ECU 21 may be comprised of a unitary computing device or computer, as suggested by FIG. 3, or may alternatively be comprised of a plurality of computers (e.g., ECUs), including, for example, a powertrain computer, itself potentially comprising an engine computer and a transmission computer, an infotainment computer, a chassis systems computer, restraint system computer, a vehicle security computer, and so on.

Pilot system 20 may include a plurality of vehicle situational awareness sensors or autonomous vehicle sensors ("AV sensors") 22. AV sensors 22 may be mounted inside a vehicle passenger cabin ("internal AV sensors") 22A, for example, behind windshield 14, and may alternatively be mounted outside of the vehicle ("external AV sensors") 22B, for example, on a roof 24 of the vehicle or in a fascia of the vehicle. A preferred location may depend on the type of sensor. An identification of several exemplary types of sensors that may be used is provided below.

ECU 21 includes an electronic processor 26 and an associated memory 28. System 20 may further include a vehicle network 30 including one or more wired and/or wireless communications media such as an example system Control Area Network ("CAN") bus or a Local Interconnect Network ("LIN") or other communications interface. Network 30 provides a transmission media between and connecting elements of pilot system 20 including ECU 21 and components and ancillary systems including, by way of example, a drive motor 32, motor sensors 34, a plurality of brake units 36, brake sensors 38, wheel speed sensors 40 associated with wheels 42, a steering actuator 44, steering sensors 46, occupant sensors 48, windshield impact sensor 17, a windshield fluid dispenser system 47, turning signals (not shown), and/or vehicle situational awareness sensors 22.

Vehicle 12 includes four wheels 42, each of which may include a tire. Each of wheels 42 may be associated with one of the brake units 36. Wheel speed sensors 40 may be integrated into brake units 36. Steering actuator 44 and associated steering sensors are incorporated into the vehicle 12 steering system. Motor 32 may, by way of example, be an internal combustion engine or an electric motor or a combination thereof, i.e., the vehicle 12 can include a so-called hybrid powertrain. Motor 32 may or may not include or be coupled to a transmission providing torque and speed ratios. Motor 32 may be a single unit near a front of vehicle 12, or motor 32 may alternatively be located elsewhere in the vehicle 12. Motor 32 may yet alternatively be provided in the form of a plurality of electric motors associated with a plurality of wheels 42. An all-wheel drive vehicle may have a motor 32 associated with each wheel 42. The windshield fluid dispenser system 47 may also be disposed on vehicle 12. The example windshield fluid dispenser system 47 may include a fluid pump, a reservoir tank and one or more example spray nozzles 49. Example spray nozzles 49 may be placed in locations and orientations allowing selective spraying of windshield fluid on windshield 14.

Each of drive motor 32, brake units 36, windshield fluid dispenser system 47 and steering actuator 44 are illustrated as connected directly to ECU 21 through network 30, but may alternatively or additionally be connected directly to ECU 21. Each of drive motor 32, brake units 36, and steering actuator 44 may include a respective electronic controller that receives instructions from ECU 21.

The memory 28 of ECU 21 includes one or more forms of computer-readable media, and stores instructions executable by the processor 26 for performing various operations, including such operations as disclosed herein. Processor 26 may read and execute such instructions. ECU 21 includes programming to autonomously operate autonomous vehicle 12 in a fully autonomous mode.

For purposes of this disclosure, the term "autonomous vehicle" is used to refer to a vehicle operating in the fully autonomous mode. The fully autonomous mode is defined as one in which each of vehicle 12 propulsion (typically via a powertrain including motor 32 as defined herein), braking, and steering are controlled by ECU 21 under substantially all circumstances. In a semi-autonomous mode, one or two of these are controlled by the ECU 21, and in a non-autonomous mode, none of them are.

Autonomous vehicles may be further enhanced with vehicle-to-vehicle communications capabilities and vehicle-to-infrastructure and infrastructure-to-vehicle communications capabilities. Vehicle-to-vehicle communications capabilities allow a vehicle to communicate with other vehicles, and adjust vehicle spacing accordingly in anticipation of, by way of example, upcoming traffic issues. Vehicle-to-infrastructure and infrastructure-to-vehicle communications capabilities allow interactive infrastructure devices, such as intersection controller (not shown), to communicate with vehicles 12. For example, vehicle 12 may be warned of an imminent intersection signal change requiring a change in speed. For this description, vehicle-to-vehicle communications capabilities and vehicle-to-infrastructure and infrastructure-to-vehicle communications capabilities are collectively identified as "V2V communications capabilities."

V2V communications capabilities are features of vehicles equipped with coordinated adaptive cruise control ("CACC"), or CACC vehicles. References to CACC in this disclosure are inclusive of V2V communications capabilities. In ordinary CACC vehicles, propulsion and braking, but not steering, are controlled by ECU 21. In autonomous CACC vehicles, each of propulsion, braking and steering are controlled by ECU 21. For purposes of this disclosure, all CACC vehicles are autonomous CACC vehicles. A non-CACC vehicle includes any vehicle that is lacks V2V communications capabilities. A non-autonomous vehicle without adaptive cruise control that is solely under the control of a human driver is an exemplary non-CACC vehicle.

V2V communications capabilities allow anticipation of upcoming traffic slowdowns and vehicles entering traffic that in turn allows a smoothing of the collective traffic flow. Circumstances that would result in gridlock or stop-and-go traffic with human drivers or fully autonomous but otherwise unconnected vehicles, may under CACC management, result in a relatively gentle slowing of traffic while maintaining a higher overall vehicle throughput.

Autonomous CACC vehicles may duplicate speed changes of an identified lead vehicle, and may also change lanes to either continue following the same vehicle or to follow a replacement lead vehicle.

The memory 28 of ECU 21 also stores data. Data may include collected data that is collected from a variety of devices. In general, collected data may include any data from a map database, and any data that may be gathered by any data collection device including motor sensors 34, wheel speed sensors 40, steering sensors 46, occupant sensors 48, AV sensors 22, impact sensor 17, and/or data computed from such data. Exemplary steering sensors 46 may include a rack position sensor and/or a lateral acceleration sensor. Exemplary AV sensors 22 may include vehicle context and position sensors and location sensors such as a radar sensor, a LIDAR sensor, a vision sensor (e.g., a camera), a global positioning system ("GPS") sensor, antennae and the like. Radar sensors may be used both for locating other objects, and for, by exploiting the Doppler effect, determining a relative velocity of such other objects. The foregoing examples are not intended to be limiting. Other types of data collection devices may be used to provide data to ECU 21. Data may also include calculated data calculated in ECU 21 from collected data and from other calculated data.

The windshield impact sensor 17 provides a voltage signal when subjected to a strain load. Strain load may be attributable to a large number of causes, including, for example, temperature changes, particularly if the windshield has a different coefficient of thermal expansion than a window frame structure that it is set in, structural deformation due to a vehicle impact, weather-related windshield impacts such as rain and hail, and debris windshield impacts such as stone impacts. Signal signatures indicative of the type of impact may be developed for the particular sensor 17 employed in the windshield. Additionally, sensor 17 may be configured to identify a location on the windshield of such impacts.

One example configuration for sensor 17 allowing identification of impact location is a grid arrangement, with a first plurality of sensors 18 oriented horizontally and a second plurality of sensors 18 oriented vertically (not shown) in the window. Yet another example arrangement of sensors 18 is illustrated in U.S. Pat. No. 7,475,587, incorporated herein by reference in its entirety, with sensors 18 of a rectangular shape arranged in a triangular pattern on the windshield.

Sensor 17 may be connected to the vehicle network 30 through connectors 19. Alternatively, connectors 19 may connect directly to ECU 21 or a subsidiary controller (not shown) disposed between ECU 21 and sensor 17. The configuration of connector 19 may depend on the design of sensor 17 and the nature of the connection with ECU 21. For example, if sensor 17 employs a single unitary film, each connector 19 may provide a single terminal for connecting to ECU 21. If sensor 17 includes a plurality of sensors 18, then connectors 19 may include a plurality of terminals for connection with ECU 21 to allow increased functionality, such as not just a determination of a stone impact, but where on the windshield such impact occurred.

ECU 21 may be programmed to identify the occurrence of a stone impact based a detection of a voltage signal or signals from sensor 17 of a particular magnitude and duration. A method or process 50 for vehicle 12 to respond to a stone impact is described below. ECU 21 may be further programmed to move vehicle 12 to a safe location, and may also be programmed to spray windshield fluid on windshield 14 in response to a perceived risk of stone impacts.

Processing

Figure 7:
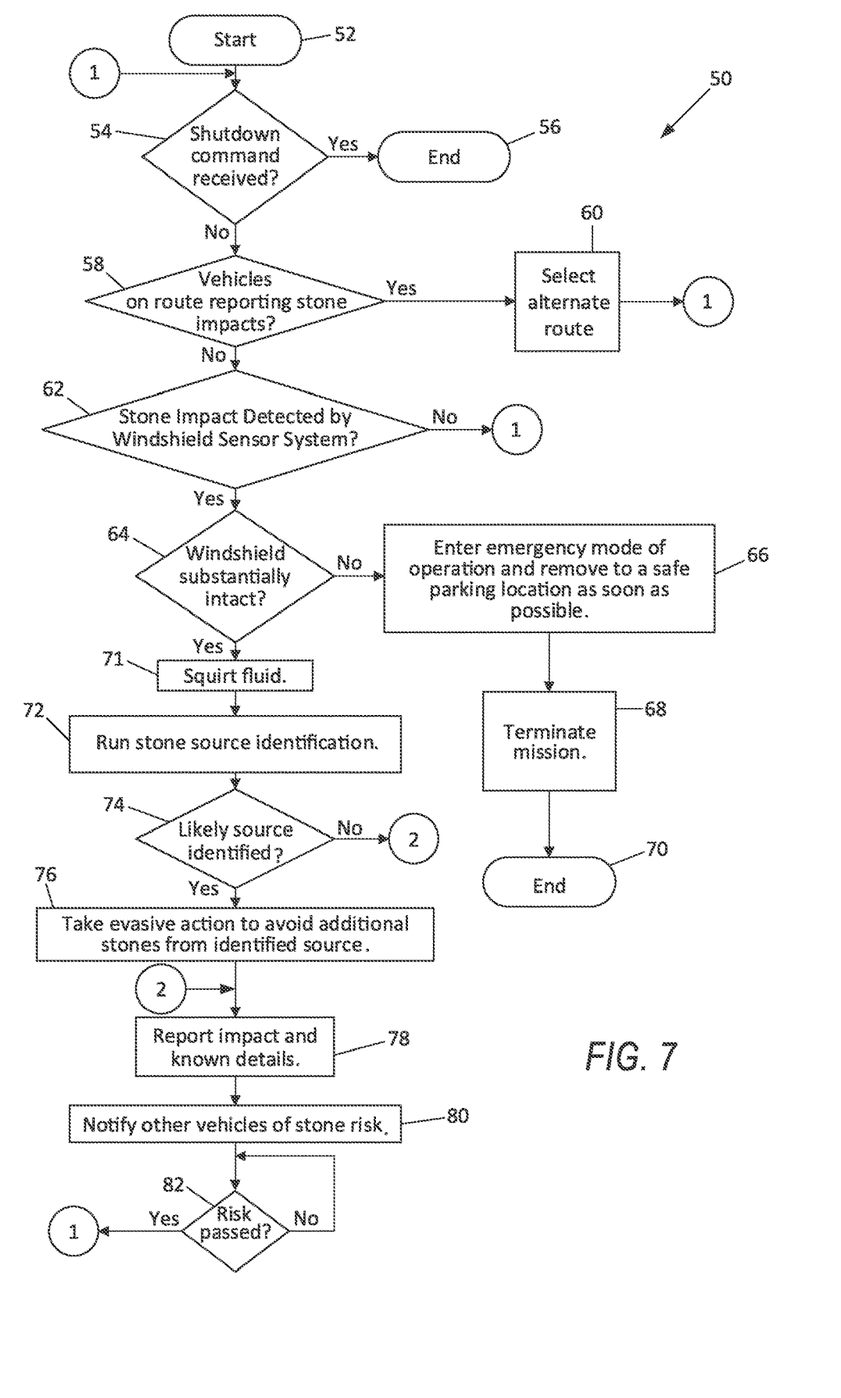
FIG. 7 is an example flowchart of a process executed by the windshield system.

FIG. 7 illustrates the stone impact response process 50 that may be stored in ECU 21 of vehicle 12. ECU 21 executes the steps illustrated in FIG. 7 as described below. A computer program for executing process 50 may be instantiated in start block 52, e.g., when a power-on command is issued, as may be associated with the vehicle being powered up responsive to an approach or a touch by a vehicle passenger.

Next, decision block 54 determines when a shutdown command has been received. The shutdown command may come from a vehicle operator and from a power controller, e.g., a body control module, or turning an ignition key between an on and an off position. Such commands may also come from a wireless network in the case of autonomous vehicles. When the shutdown command has been confirmed as received, process 50 moves to end block 56 and terminates. When the receipt of the shutdown command is not received, process 50 moves to decision block 58.

Decision block 58 determines whether vehicles on the selected route of vehicle 12 are reporting incidents of stone impacts. Such reports may be made via V2V communications or through any alternative inter-vehicle communications network. When such reports are received, vehicle 12 may go to process block 60 which selects an alternate route. Such alternate route selection may consider factors such as time penalty for the selection of the alternate route over the stone-risk route, and a risk of stones on the alternate route. From process block 60, process 50 returns to decision block 54. When no vehicles ahead are reporting stone impacts, process 50 moves to decision block 62.

Decision block 62 determines whether the windshield 14 has been impacted by a stone. Such a determination may consider several factors including, for example, a magnitude of the impact, a profile of a force versus time plot of the impact, a frequency of impacts, and a damage analysis of the impact. Consideration of the magnitude of the impact and the profile may include comparing sensor data from the impact, including the magnitude and the profile of the impact data, against exemplary a library of stored categorized data values of magnitude and profile. The library of data values may include representative values of controlled windshield impacts generated in a laboratory setting employing a representative windshield 14 and supporting structure. Library data values may include impacts by a variety of objects likely to strike a windshield, including stones or stone-substitutes such as steel balls. Such data may vary the impact parameters in a controlled manner. The impact parameters may include a matrix of impact variables, including the type of object, the mass of the object, the speed of the object, the angle of impact, and the location of the impact on the windshield 14. Responsive to an impact, the windshield sensor data may be compared with the stored library of impact profiles to identify a potential stone impact.

In addition to the impact parameters mentioned above, the magnitudes and profiles of the output of sensor 18 depend on a large number of variables relating to the structure of the windshield, its mounting in the vehicle 12, and the types and locations of sensors 18. Windshield 14 variances may include an overall thickness of the windshield, a lamination structure of the windshield including a thickness of individual layers and the number of layers and the types of material of each layer. The windshield mounting structure variances may include a stiffness of vertical body pillars, a stiffness of cross-vehicle window frame members, and a thickness and stiffness of glass-to-frame seals. Sensor variances may include the type and location of sensors 18 as discussed above. Combined object/windshield interaction variables may include a location of impact on the windshield 14, an angle of impact relative to the windshield, and a direction of impact on the glass relative to the direction of the windshield 14. These variables may be addressed using laboratory testing as described above to generate the library of magnitudes and profiles, and by using computer simulation models of the design-intent windshield and its associated mounting structure.

As an alternative to, or supplemental to consulting the library of data values, it may additionally be possible to establish a simple mathematical model of stone impacts in the form of an equation that allows a stone impact against the windshield to be recognized as such. One example model is provided by a threshold pressure value for identifying a stone impact. An impact causing a pressure signal value above the threshold value is a stone impact. An impact causing a pressure signal value below the threshold value is not a stone impact, and may be, for example, an insect impact or a raindrop impact. For a given windshield, an impact generating a signal exceeding the threshold value may be treated as a stone impact.

Following an impact, including an ambiguous impact close to the threshold pressure value, i.e., within a predetermined band surrounding the threshold pressure value, the windshield 14 may be scanned by a camera serving as one of sensors 22A. Data from the camera may be used by processor 26 to identify anomalies in the windshield 14, otherwise called windshield anomalies, as possible chip locations in windshield 14. While some such anomalies may be insects or road debris including dirt and tar, an identification of the locations of such anomalies may be helpful in locating chip locations. As an additional step in identifying an anomaly as a stone chip, windshield fluid may be sprayed from nozzle 49 against windshield 14, and a windshield wiper activated in an attempt to clear the anomaly from the windshield. When the anomaly does not clear, the anomaly is treated as a stone chip.

Stones, for the purpose of this description, include ice. At temperatures below the freezing point of water, crystalized water, i.e. ice, is a mineral and thus a stone. Ice, including for example ice falling from or being thrown off the roof of a large truck, may present the same hazards posed by other stones. Accordingly, processor 26 may be programmed to recognize ice impacts as stone impacts. While it is a form of ice, hail may be distinguished from other stone impacts by the processor 26 from stones based on a frequency of impacts. A relatively high frequency of impacts, that is a large number of impacts, e.g. ten or more impacts, in a short period of time, such as more than one impact per second, may be an indicator of a weather phenomenon, such as hail, rather than an impact or impacts by a discrete stone or stones. For the purpose of this description, hail impacts, when recognized as such, are not stone impacts. Hail impacts are not recognized as stone impacts as there may be no allowable driving maneuver that will allow the vehicle 12 to avoid the hail. When it is determined that it was not a stone impact that was detected, process 50 cycles back to decision block 54. When it is determined that a stone impact has been detected, process 50 may move on to decision block 64.

Decision block 64 determines whether windshield 14 remains substantially intact. Examples of windshields 14 no longer substantially intact include a windshield with a perforation that extends entirely through all lamination layers of the windshield, and a windshield that has overlapping cracks through multiple lamination layers of glass. This may be determined by comparing the magnitude and profile of the impact with a magnitude and profile a reference or library impact that has shattered or perforated a similar or identical windshield. Alternative indications of a shattered windshield may include certain sensors 18 becoming unavailable to ECU 21. Such unavailability may be interpreted as an interruption of the glass surface. Alternatively, if data from sensor 17 indicates that an upper limit of an ultimate strength of glass has been exceeded, then processor 26 may conclude that windshield 14 has been broken. Yet further alternatively, if a data from one of sensors 22A inside cabin 15, such as the camera, is indicative of a crack or a plurality of cracks, then processor 26 may conclude that windshield 14 has been broken.

When decision block 64 determines that windshield 14 is not substantially intact, then process 50 moves to process block 66 which causes the vehicle 12 to enter an emergency state of operation. The emergency mode of operation may include moving the vehicle 12 to a safe parking location as soon as safely practicable. A safe parking location may be on a shoulder of the road. The emergency mode of operation may also include notifying a first responder of possible injuries, and notifying a dispatch service that the vehicle 12 has been compromised and may need towing. Once vehicle 12 has completed any undertakings directed by process block 66, process 50 may move to process block 68 to terminate a current vehicle mission. Following such mission termination, process 50 may move to end block 70 and terminate.

When decision block 64 determines that the windshield remains intact, process 50 may move to process block 71. Process block 71 directs the windshield fluid dispenser system 47 to spray windshield fluid through nozzle or nozzles 49 onto windshield 14. The windshield fluid may include soap or other additives that, together with the volume of fluid, act as a lubricant between any additional stones that may strike the windshield 14 and the windshield 14. Such spray may be maintained while there is a continuing perceived risk of stone impact, as when vehicle 12 is behind or is passing a possible source of stones, such as a gravel hauler 75.

From block 71, process 50 may move to process block 72 to execute a stone source identification. Stone source identification may employ one or more of the AV sensors 22. ECU 21 may analyze data available from sensors 22 to assess whether there are any large trucks in front of vehicle 12 that may have dropped a stone from a cargo area of the vehicle or thrown a stone with one of its tires. ECU 21 may store data from sensors for a period of time, with such data being continuously updated. An impact may trigger ECU to file all available stored data.

The term "large truck" is associated with weight, mass, and or dimensions that can be stored in a memory of the ECU 21, and that can thus be changed. In one example "large truck" means commercial trucks having a gross vehicle weight rating of 10,000 pounds or more. Further, ECU 21 could be programmed to recognize other vehicles, e.g., vans, large sedans etc., as proxies for a "large truck" in the context of this disclosure.

As ECU 21 is not able to weigh other vehicles, ECU 21 may be programmed to recognize size as a proxy for weight. For example, ECU 21 is able to use data from sensors to estimate a distance from vehicle 12 to vehicles within a line of sight. Distance estimates, together with an image of vehicles within sight of sensors 22 allows an estimation of a size of such vehicles. ECU 21 may be programmed to recognize any vehicle exceeding 20 feet in length as a large truck. An alternative visually discernable parameter such as vehicle height or width may be used instead, as height and width are more easily discerned when a targeted vehicle is directly in front of vehicle 12. An exemplary height target may be eight feet, and an exemplary width may be seven feet. Or yet further alternatively, a combination of any combination of length and width and height may be targeted to distinguish a large truck. Once identified, a large truck may be located by ECU 21. Locating a truck may include determining its position and direction of motion relative to vehicle 12. Large trucks traveling in the same direction as vehicle 12, being located in front of or adjacent to vehicle 12, and within a predetermined radius of vehicle 12, an exemplary predetermined radius being 0.25 miles, may be considered to be a likely source of stones. How target parameters are established is not critical to the system 10. Target parameters for identifying large vehicles may be predetermined, or may be learned by ECU 21 if ECU 21 is equipped with computational intelligence.

The stored data may be analyzed to potentially determine the source of the impact stone more accurately. For example, if a point of impact on the windshield can be determined, it may be possible to determine a path of the object. Such analysis may also determine whether a potentially stone dropping or stone throwing vehicle may alternatively or additionally be carrying an improperly secured load that may have resulted in the offending impact.

Figure 6A:
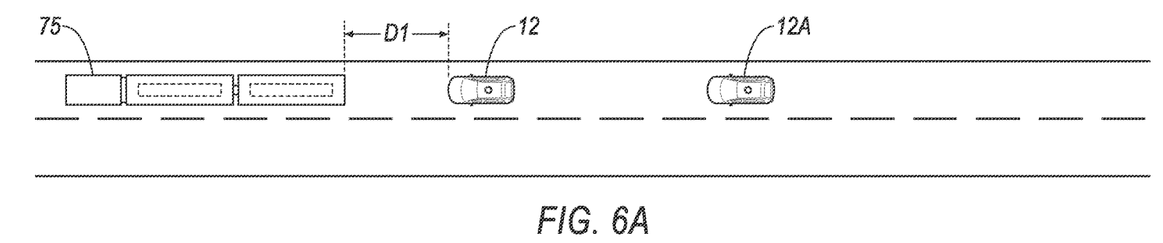
FIG. 6A is a schematic illustration of a first autonomous vehicle trailing an example gravel hauler at a first distance and followed by a second autonomous vehicle.
Figure 6B:
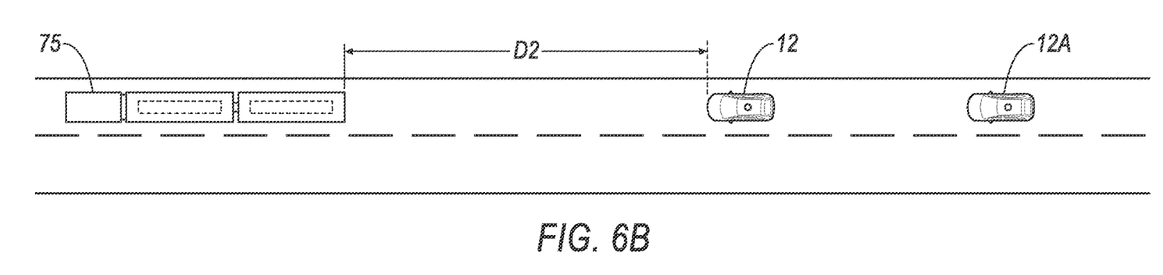
FIG. 6B is a schematic illustration of the autonomous vehicles of FIG. 6A in a first evasive position.
Figure 6C:
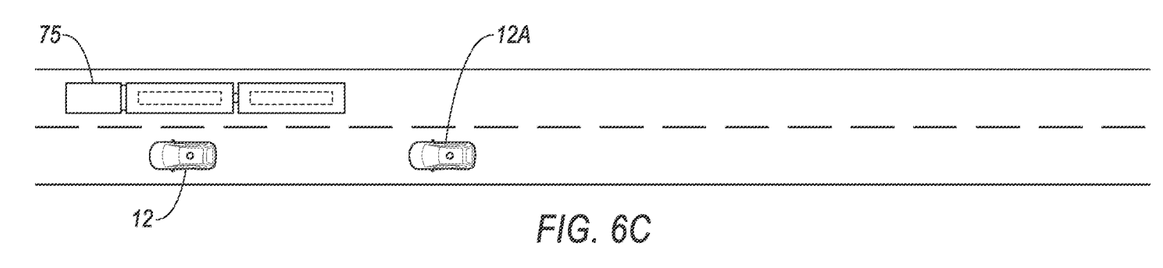
FIG. 6C is a schematic illustration of the autonomous vehicles of FIGS. 6A and 6B in in a second evasive position.

Process block 72 may be followed by decision block 74 which determines whether process block 72 was able to identify a likely source of the offending stone. Once a stone source is identified, then appropriate source-specific responses include evasive maneuvers may be initiated. For example, if a moving vehicle, such as a large truck in the form of a gravel hauler 75 as illustrated in FIG. 6A is identified as a likely source of stones, specific responses may be initiated. An example response may include process block 76 directing vehicle 12 to execute a first evasive maneuver. The first evasive maneuver may be to slow down the autonomous vehicle 12 to increase an amount of space between vehicle 12 and the large truck 75 from D1 as illustrated in FIG. 6A to D2 as illustrated in FIG. 6B. A vehicle 12A behind vehicle 12 may be linked to vehicle 12 by V2V communications, and may also slow down to avoid stone impacts. Additionally, or alternatively, process block 76 may direct vehicle 12 to execute a second evasive maneuver. The second evasive maneuver may be to move the autonomous vehicle 12 to an open lane not behind the large truck 75 as illustrated in FIG. 6C. A following vehicle 12A may be linked to vehicle 12 by V2V communication, and may also change lanes to avoid stone impacts. When passing the large truck 75, vehicles 12 and 12A may be at risk of additional stone impacts. Accordingly, vehicles 12 and 12A may spray their windshields with windshield fluid while passing. When a likely source is not identified, then process 50 will skip process block 76 and proceed from the block 74 to a process block 78.

Figure 5:
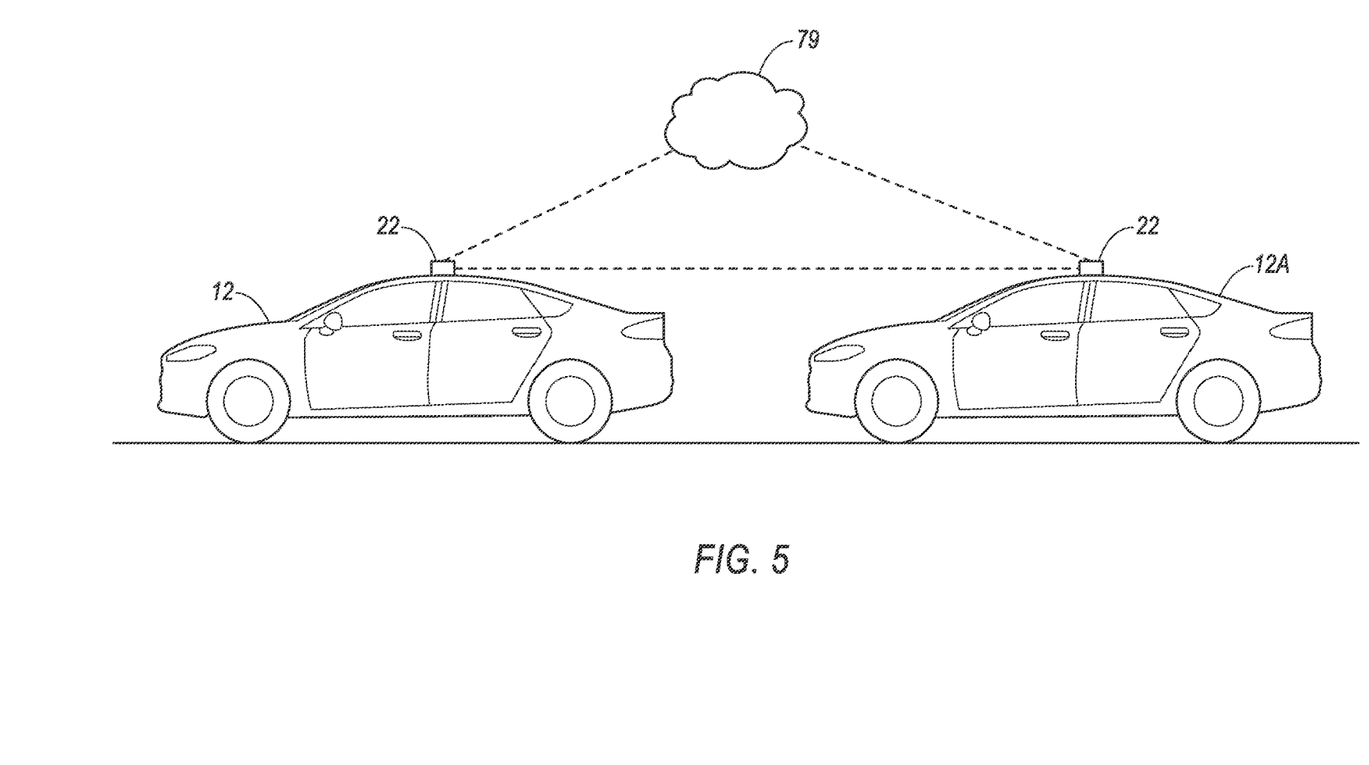
FIG. 5 is a schematic illustration of an example vehicle communication system.

In block 78, which can follow either of the blocks 74, 76, vehicle 12 may create a report of the stone impact. The report may include information on details of each stone impact, including, if available, an approximate location of the impact and a relative force of the impact, the type of damage to the windshield, such as a chip or a crack, and a date and time of the impact, and may further include information such as the then-current operating conditions of the vehicle, such as vehicle speed, temperature including an ambient environmental temperature, and a geographic location of where the impact occurred. Such a report may be stored in the ECU 21 for later down-loading, e.g., to a remote computer. The report may also or alternatively display on a vehicle status information panel inside the cabin 15 in the form of a warning for viewing by a vehicle occupant including by way of example a passenger and a service technician. Such a warning may also or alternatively be provided in an audible format. The report, yet alternatively, may also be communicated to a cloud-based network 79 including, by way of example, a vehicle service network or a fleet operations network. The reports may motivate a person interfacing with the vehicle, including, by way of example, a vehicle occupant or a service technician or a fleet manager or an owner, to inspect the windshield 14 for damage. Upon finding any damage, the person interfacing with the vehicle may have such damage repaired, either by doing it themselves or by having others do the repair. Having repaired the damage, or having had it repaired, or alternatively finding the windshield sound and not in need of repair, the service technician or other interfacing person may provide an input to ECU 21 to terminate the warning. Such information may allow prompt windshield repair or replacement, and may direct a vehicle response to minimize any aggravation of any crack or chip in the windshield 14.

Following the issuance of a report of an impact, the ECU 21 may cause the vehicle to park in an area not in direct sunlight until there is an opportunity for the vehicle windshield to be inspected. Avoiding direct sunlight will reduce a risk of a stone chip becoming an irreparable crack.

Having complied with any directives responsive to network instructions, process 50 moves to process block 80. In process block 80, vehicle 12 may use V2V communication to alert following vehicles 12A of the stone impact and the geographic location of the impact by sending a message to such following vehicles. Process block 80 may send out such an alert or message to other vehicles after just a single impact, or may alternatively be configured to send out such an alert or message after a plurality of impacts, such as three, in less than a predetermined period of time, five minutes being an exemplary period of time.

Having completed the instructions in block 80, process 50 may continue to decision block 82. Decision block 82 determines whether, based on the information available, an immediate risk of stone impacts has passed. Such an assessment may be based on information from other vehicles on whether there are any other vehicles suffering stone impacts, data from the sensors 22 of the vehicle 12 indicating the presence of stone impact risks, such as large trucks. Decision block may determine that the risk has passed when there are no large trucks in front of vehicle 12 and a predetermined period of time, such as three minutes, has passed since the last stone impact. When it is determined that the risk has passed, process 50 loops back to decision block 54. When it is determined that the risk has not passed, process 50 continues to check for the passing of the risk.

Conclusion

An example system and method for identifying and responding to a stone impact has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device, programmed to:
   identify an impact to a vehicle windshield as a stone impact based on data from a pressure sensor in the windshield; and
   upon identifying the stone impact, identify any large truck located within a predetermined radius of the vehicle, and actuate the vehicle to make an evasive maneuver.

2. The computing device of claim 1, wherein the evasive maneuver includes one of passing the large truck, and increasing a distance between the large truck and the vehicle.

3. The computing device of claim 1, wherein the evasive maneuver is passing the large truck and the computing device is further programmed to spray windshield fluid on the windshield during the evasive maneuver.

4. The computing device of claim 1, further programmed to deliver an impact report to a person interfacing with the vehicle.

5. The computing device of claim 4, further programmed to transmit a warning readily apparent to a vehicle occupant that the windshield may be compromised.

6. The computing device of claim 5, further programmed to terminate the warning responsive to input from a service technician that one of the windshield has been inspected and found sound, and any damage identified by the technician has been repaired.

7. The computing device of claim 1, further programmed to send a message alerting other vehicles of a stone impact risk and a location of the risk after identifying the stone impact.

8. The computing device of claim 1, further programmed to send a message alerting other vehicles of a stone impact risk and a location of the stone impact risk after identifying a plurality of stone impacts.

9. The computing device of claim 1, further programmed to, after receiving a plurality of stone impact messages from other vehicles identifying a stone impact risk and a stone impact risk location, select a new route away from the location of the stone impact risk.

10. The computing device of claim 1, further programmed to detect windshield anomalies using data from a camera comprising an autonomous vehicle sensor.

11. A method of determining and responding to a windshield stone impact, the method comprising the steps of:
   providing a vehicle having a windshield including an integral pressure sensor; and
   identifying an impact against the windshield as a stone impact based on data from the pressure sensor;
   responsive to identifying the stone impact, identifying any large truck located within a predetermined radius of the vehicle; and
   responsive to identifying a large truck, directing the vehicle to make an evasive maneuver.

12. The method of claim 11, wherein the evasive maneuver includes one of passing the large truck, and increasing a distance between the large truck and the vehicle.

13. The method of claim 11, wherein the evasive maneuver is passing the large truck and the method further comprises the step of spraying windshield fluid on the windshield during the evasive maneuver.

14. The method of claim 11, further comprising the step of delivering an impact report to a person interfacing with the vehicle.

15. The method of claim 14, further comprising the steps of:
   the person interfacing with the vehicle inspecting for damage to the windshield; and
   upon the person finding damage to the windshield, the person having the damage repaired.

16. The method of claim 11, further comprising the step of sending a message alerting other vehicles of a stone impact risk and a location of the risk after identifying the stone impact.

17. The method of claim 11, further comprising the step of sending a message alerting other vehicles of a stone impact risk and a location of the stone impact risk after identifying a plurality of stone impacts.

18. The method of claim 11, further comprising the step of selecting a new route away from a stone impact risk location after receiving a plurality of stone impact messages from other vehicles identifying the stone impact risk location.

19. The method of claim 11, further comprising the step of detecting windshield anomalies using data from a camera comprising an autonomous vehicle sensor.

20. The method of claim 11, further comprising the step of parking the vehicle in an area not in direct sunlight after identifying an impact as a stone impact.

* * * * *